US012605814B2

(12) United States Patent
Danner et al.

(10) Patent No.: US 12,605,814 B2
(45) Date of Patent: Apr. 21, 2026

(54) FOLDING CLIP EXTRACTOR

(71) Applicant: VIS, LLC, Travelers Rest, SC (US)

(72) Inventors: Christopher Bradley Danner, Greer, SC (US); Walter Anthony Herbert, Greer, SC (US)

(73) Assignee: VIS, LLC, Travelers Rest, SC (US)

(*) Notice: Subject to any disclaimer, the term of this patent is extended or adjusted under 35 U.S.C. 154(b) by 295 days.

(21) Appl. No.: 18/443,849

(22) Filed: Feb. 16, 2024

(65) Prior Publication Data

US 2025/0262732 A1 Aug. 21, 2025

(51) Int. Cl.

| | |
|---|---|
| ***B66F 15/00*** | (2006.01) |
| ***B25B 27/14*** | (2006.01) |
| ***B25G 1/08*** | (2006.01) |
| ***B25G 3/38*** | (2006.01) |
| *B25B 27/00* | (2006.01) |

(52) U.S. Cl.
CPC ................ *B25B 27/14* (2013.01); *B25G 1/08* (2013.01); *B25G 3/38* (2013.01); *B25B 27/0035* (2013.01)

(58) Field of Classification Search
CPC .................................. B25G 3/38; B66F 15/00
See application file for complete search history.

(56) References Cited

U.S. PATENT DOCUMENTS

| | | | | |
|---|---|---|---|---|
| D256,442 | S * | 8/1980 | Martin | D8/89 |
| 5,495,651 | A * | 3/1996 | Tsuha | B25B 27/02 29/237 |
| 6,663,082 | B1 * | 12/2003 | Ploeger | B25C 11/00 254/129 |
| 8,713,773 | B2 * | 5/2014 | Foxx | B25B 27/0028 29/270 |
| D972,381 | S * | 12/2022 | Wang | D8/14 |
| 2024/0375262 | A1 * | 11/2024 | Call | B25G 1/063 |
| 2025/0262732 | A1 * | 8/2025 | Danner | B25G 3/38 |
| 2025/0282038 | A1 * | 9/2025 | Danner | B25B 27/14 |

* cited by examiner

*Primary Examiner* — Lee D Wilson
(74) *Attorney, Agent, or Firm* — Thrive IP

(57) ABSTRACT

A trim and clip extractor tool includes a handle with a storage compartment and an axle to which an extractor blade is rotatably connected. The blade has a channel formed between prongs, and the extractor blade and its prongs are folded and stored in the compartment when not in use.

7 Claims, 7 Drawing Sheets

FOLDING CLIP EXTRACTOR

BACKGROUND OF THE DISCLOSURE

Clip lifters are used to remove clips, trim, panels, and the like and also for prying and interior disassembly. However, known clip lifters cannot be folded nor are they easy to carry, for instance, in a pocket without tearing pocket material or possibly injuring a technician.

What is needed in the industry is a clip lifter that can be folded into a compact state for storage when not in use. Moreover, the desired clip lifter should be easy, convenient, and safe to handle and manipulate.

BRIEF SUMMARY OF THE DISCLOSURE

The present disclosure is directed to compact, portable, trim and clip lifters or extractors for use by technicians in automotive, marine, aviation, industrial industries, and the like. The clip extractors can be folded and pocketed when not in use but can be opened easily during repetitive tasks, such as those requiring clip, trim, or panel removal, which may require both hands one moment then, in the next instance, require a clip removal, and so on.

In one embodiment according to the disclosure, a trim and clip extractor includes a handle having a distal handle end and a proximal handle end and a compartment formed therebetween; an axle disposed proximate the proximal handle end; and an extractor blade having a distal blade end and a proximal blade end, the distal blade end having prongs forming a channel therebetween, the proximal blade end rotatably connected to the axle at the proximal handle end, the extractor blade and the prongs being configured for storage in the compartment when not in use. The prongs can be formed at an angle relative to the extractor blade, and the channel in the blade is sized to receive a workpiece, such as a panel clip, for extraction.

Also in this embodiment, the trim and clip extractor can include a latch located in the compartment, which is in contact with the extractor blade. A catch is in communication with the latch, which can be pressed to release the latch so that the extractor blade can rotate about the axle.

In another embodiment, a trim and clip extractor may include a handle having a distal handle end and a proximal handle end and a compartment formed therebetween; an axle disposed proximate the proximal handle end; and a plurality of extractor blades each having a distal blade end and a proximal blade end, each distal blade end having prongs forming a channel therebetween, at least one of the channels being different in size from the other channels, each proximal blade end being rotatably connected to the axle at the proximal handle end, the extractor blades and their respective prongs being configured for storage in the compartment when not in use. The prongs in this embodiment may be formed at an angle relative to their respective extractor blades, and their different channel sizes are complementary to different workpiece sizes.

Additional objects and advantages of the present subject matter are set forth in, or will be apparent to, those of ordinary skill in the art from the description herein. Also, it should be further appreciated that modifications and variations to the specifically illustrated, referenced, and discussed features, processes, and elements hereof may be practiced in various embodiments and uses of the disclosure without departing from the spirit and scope of the subject matter. Variations may include, but are not limited to, substitution of equivalent means, features, or steps for those illustrated, referenced, or discussed, and the functional, operational, or positional reversal of various parts, features, steps, or the like. Those of ordinary skill in the art will better appreciate the features and aspects of the various embodiments, and others, upon review of the remainder of the specification.

BRIEF DESCRIPTION OF THE DRAWINGS

A full and enabling disclosure of the present subject matter, including the best mode thereof directed to one of ordinary skill in the art, is set forth in the specification, which refers to the appended figures, wherein.

DETAILED DESCRIPTION OF THE DISCLOSURE

Figure 1:
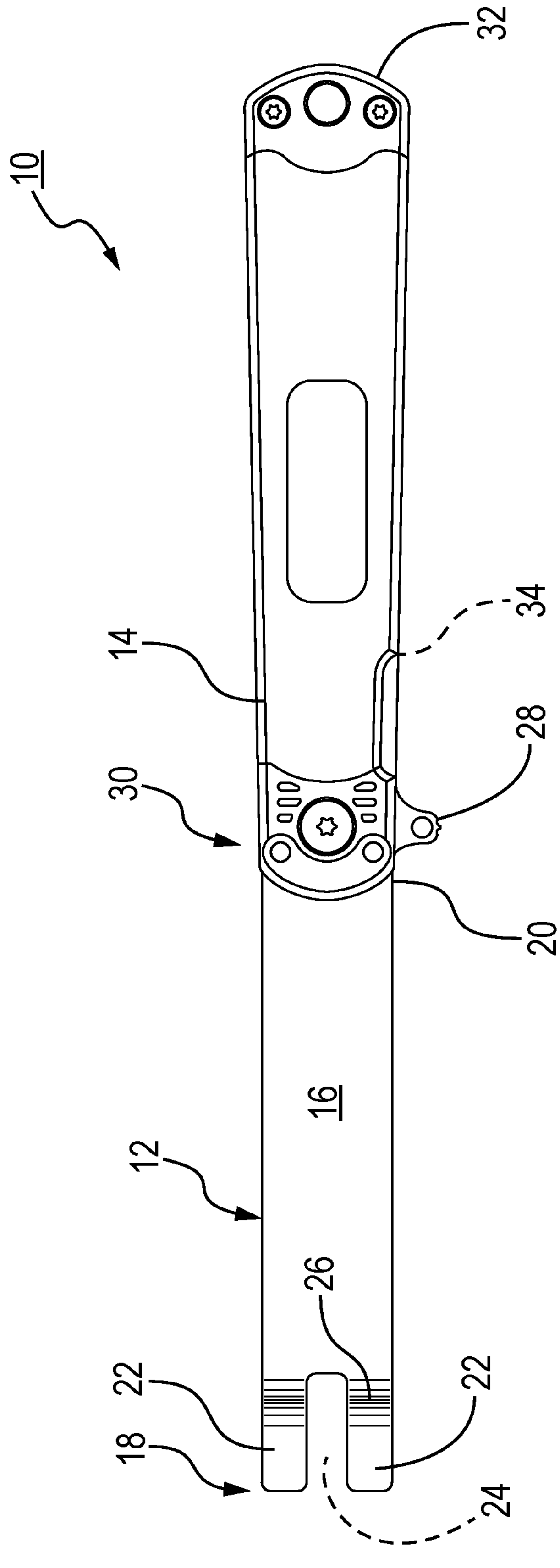
FIG. 1 is a top plan view of an exemplary clip extractor tool shown in a first open state according to an aspect of the disclosure.

As required, detailed embodiments are disclosed herein; however, the disclosed embodiments are merely examples and may be embodied in various forms. Therefore, specific structural and functional details disclosed herein are not to be interpreted as limiting, but merely as a basis for the claims and as a representative basis for teaching one skilled in the art to variously employ the exemplary embodiments of the present disclosure, as well as their equivalents.

Unless defined otherwise, all technical, engineering, and scientific terms used herein have the same meaning as is commonly understood by one of ordinary skill in the art to which this disclosure belongs. In the event that there is a plurality of definitions for a term, phrase, or acronym herein, those in this section prevail unless stated otherwise.

Wherever the phrase "for example," "such as," "including," and the like are used herein, the phrase "and without limitation" is understood to follow unless explicitly stated otherwise. Similarly, "an example," "exemplary," and the like are understood to be non-limiting.

The term "substantially" allows for deviations from the descriptor that do not negatively impact the intended purpose. Descriptive terms are understood to be modified by the term "substantially" even if the word "substantially" is not explicitly recited.

The term "about" when used in connection with a numerical value refers to the actual given value, and to the approximation to such given value that would reasonably be inferred by one of ordinary skill in the art, including approximations due to the experimental and or measurement conditions for such given value.

The terms "comprising" and "including" and "having" and "involving" (and similarly "comprises", "includes," "has," and "involves") and the like are used interchangeably and have the same meaning. Specifically, each of the terms is defined consistent with the common United States patent law definition of "comprising" and is therefore interpreted to be an open term meaning "at least the following," and is also interpreted not to exclude additional features, limitations, aspects, et cetera. Thus, for example, "a device having components a, b, and c" means that the device includes at least components a, b, and c. Similarly, a phrase such as: "a method involving a, b, and c" means that the method includes at least steps a, b, and c.

Where a list of alternative component terms is used, e.g., "a structure such as 'a', 'b', 'c', 'd' or the like," or "a or b," such lists and alternative terms provide meaning and context for the sake of illustration, unless indicated otherwise. Also, relative terms such as "first," "second," "third," "front," and "rear" are intended to identify or distinguish one component or feature from another similar component or feature, unless indicated otherwise herein.

Unless the context clearly requires otherwise, throughout the description and the claims, the words "comprise," "comprising," and the like are to be construed in an inclusive sense as opposed to an exclusive or exhaustive sense; in the sense of "including, but not limited to."

The various embodiments of the disclosure and/or equivalents falling within the scope of present disclosure overcome or ameliorate at least one of the disadvantages of the prior art or provide a useful alternative.

Detailed reference will now be made to the drawings in which examples embodying the present subject matter are shown. The detailed description uses numerical and letter designations to refer to features of the drawings. The drawings and detailed description provide a full and written description of the present subject matter, and of the manner and process of making and using various exemplary embodiments, so as to enable one skilled in the pertinent art to make and use them, as well as the best mode of carrying out the exemplary embodiments. The drawings are not necessarily to scale, and some features may be exaggerated to show details of particular components. Thus, the examples set forth in the drawings and detailed descriptions are provided by way of explanation only and are not meant as limitations of the disclosure. The present subject matter thus includes any modifications and variations of the following examples as come within the scope of the appended claims and their equivalents.

Turning now to FIG. 1, a foldable, compact, portable, trim and clip lifter (also referenced herein as a tool or extractor) is broadly designated by element number 10. The clip lifter 10 may generally include a foldable blade 12 and a handle 14. Here, the blade 12 includes a shaft 16 formed from stainless steel or other durable metal or material. The shaft 16 has a distal end 18 and a proximal end 20 rotatably connected to the handle 14. In this example, the distal end 18 includes prongs 22 that form a gap or channel 24. Further, the prongs 22 may be bent or angled approximately thirty degrees (30°) from a major or longitudinal axis of the shaft 16 to form a bend 26, which, in conjunction with the prongs 22 and the channel 24, will be used to remove, e.g., clips as described below.

FIG. 1 further shows that the blade 12 may include a thumb release 28 located near the proximal end 20 of the shaft 16 and near a proximal end 30 of the handle 14 spaced apart from its distal end 32. The thumb release 28 is activated by a technician to release the shaft 16 and extend the blade 12 from a storage compartment 34 formed in the handle 14, as discussed in greater detail with respect to FIGS. 4 and 5 below.

Figure 2:
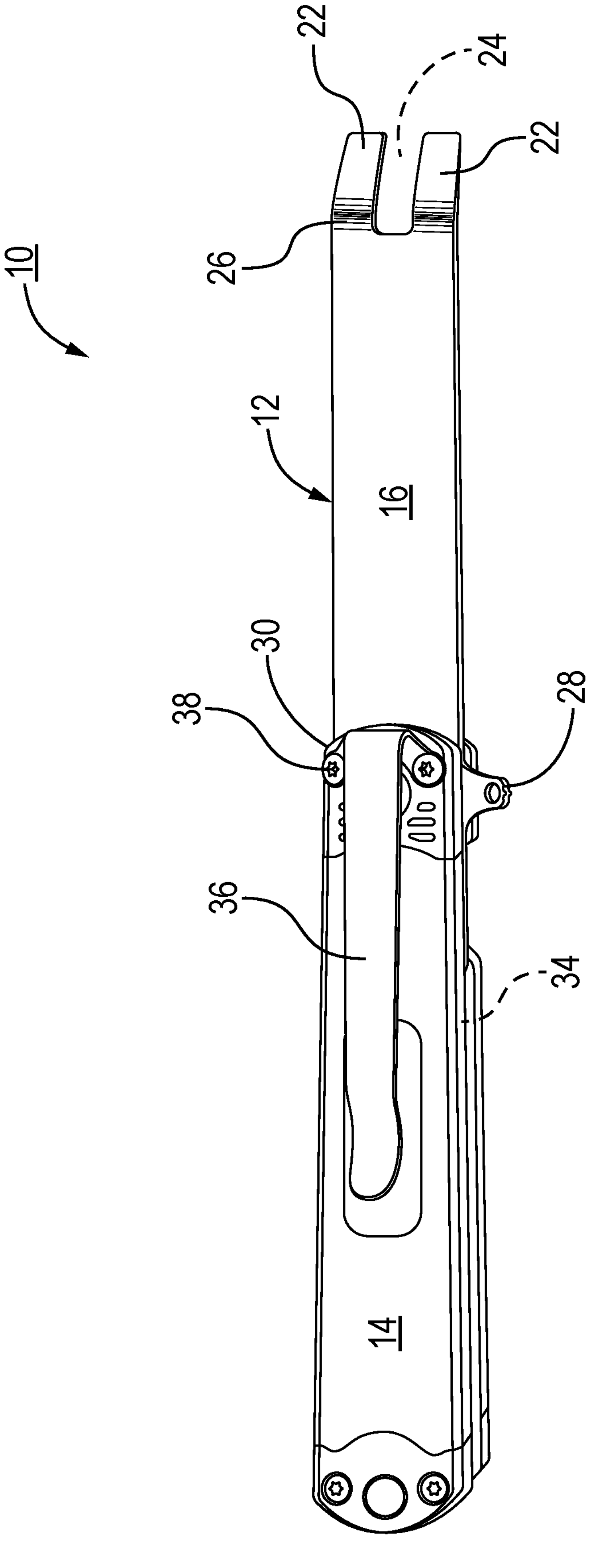
FIG. 2 is a bottom perspective view of the clip extractor tool as in FIG. 1.

FIG. 2 shows a reverse side of the clip lifter 10. Here, the blade 12 and its shaft 16 extend from the storage compartment 34 and clearly shown are the prongs 22, the channel 24, the bend 26, and the thumb release 28 introduced with respect to FIG. 1 above. The handle 14 may further include a clip 36 attached by rivets or screws 38 to the proximal end 30 of the handle 14. The clip 36 has a spring constant to urge the clip 36 toward a surface of the handle 14, which can be used by the technician to hook or attach the clip lifter 10 to a pocket or in another convenient place or position.

Figure 3:
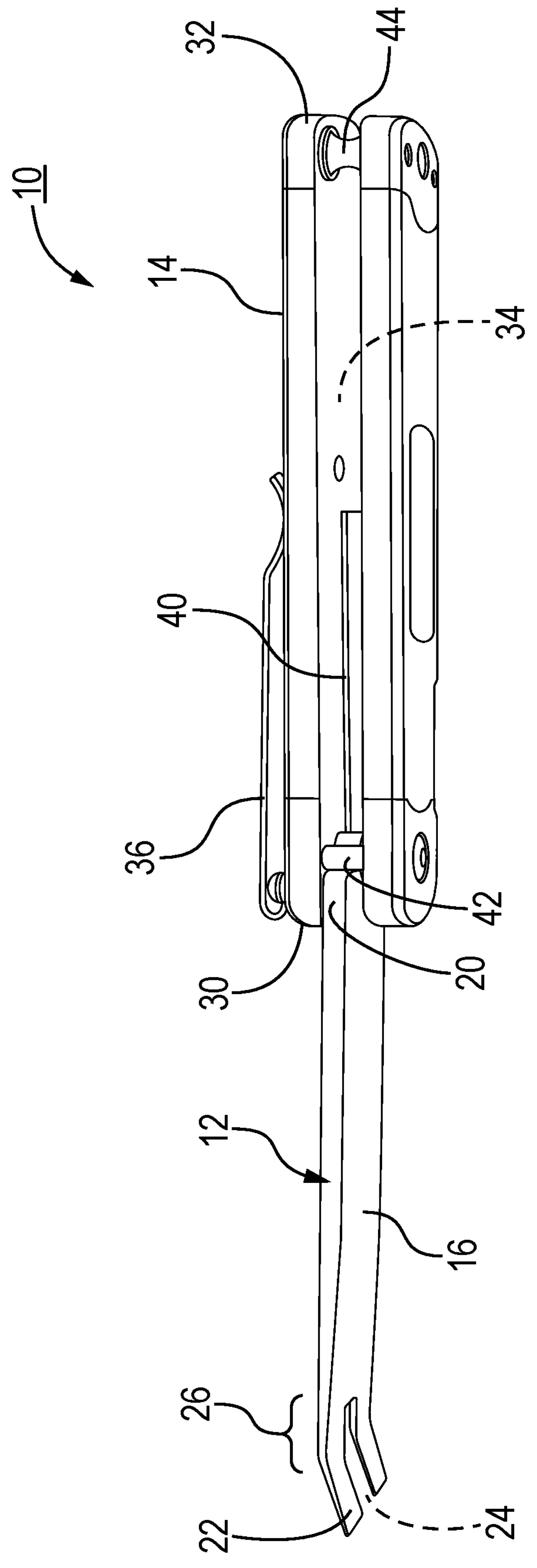
FIG. 3 is a side perspective view of the clip extractor tool as in FIG. 1.

With reference to FIG. 3, the clip lifter 10 and its blade 12 and handle 14 are shown in perspective with the prongs 22, the channel 24, and the bend 26 extending from the shaft 16. Near the distal end 32 of the handle 14 in FIG. 3 a spacer 44 is provided to help form the compartment 34 that stores and protects the blade 12 and its shaft 16 when not in use. Near the proximal end 30 of the handle 14 a hinge, fulcrum, or axle 42 is provided to which the proximal end 20 of the shaft 16 is rotatably connected. Still further, within the compartment 34 there is a spring element, release, or latch 40, which—when the thumb release 28 (see FIG. 2) is pressed in a direction away from the clip 36—releases or neutralizes a spring constant or holding tension to free the blade 12 to permit it to rotate around the axle 42 and out of the compartment 34 for use. Once fully extended outside of the compartment 34, the blade 12 the spring constant reengages to lock the blade 12 into an operational position until the release 28 is activated again to release the blade 12 for folding back into the compartment 34. Here, the axle 42 also serves in conjunction with the spacer 44 to form the compartment 34. More particularly, the axle 42 and the spacer 44 ensure that the compartment 34 has a width sufficient to accommodate the angled prongs 22 with the bend 26 relative to the shaft 16.

Figure 4:
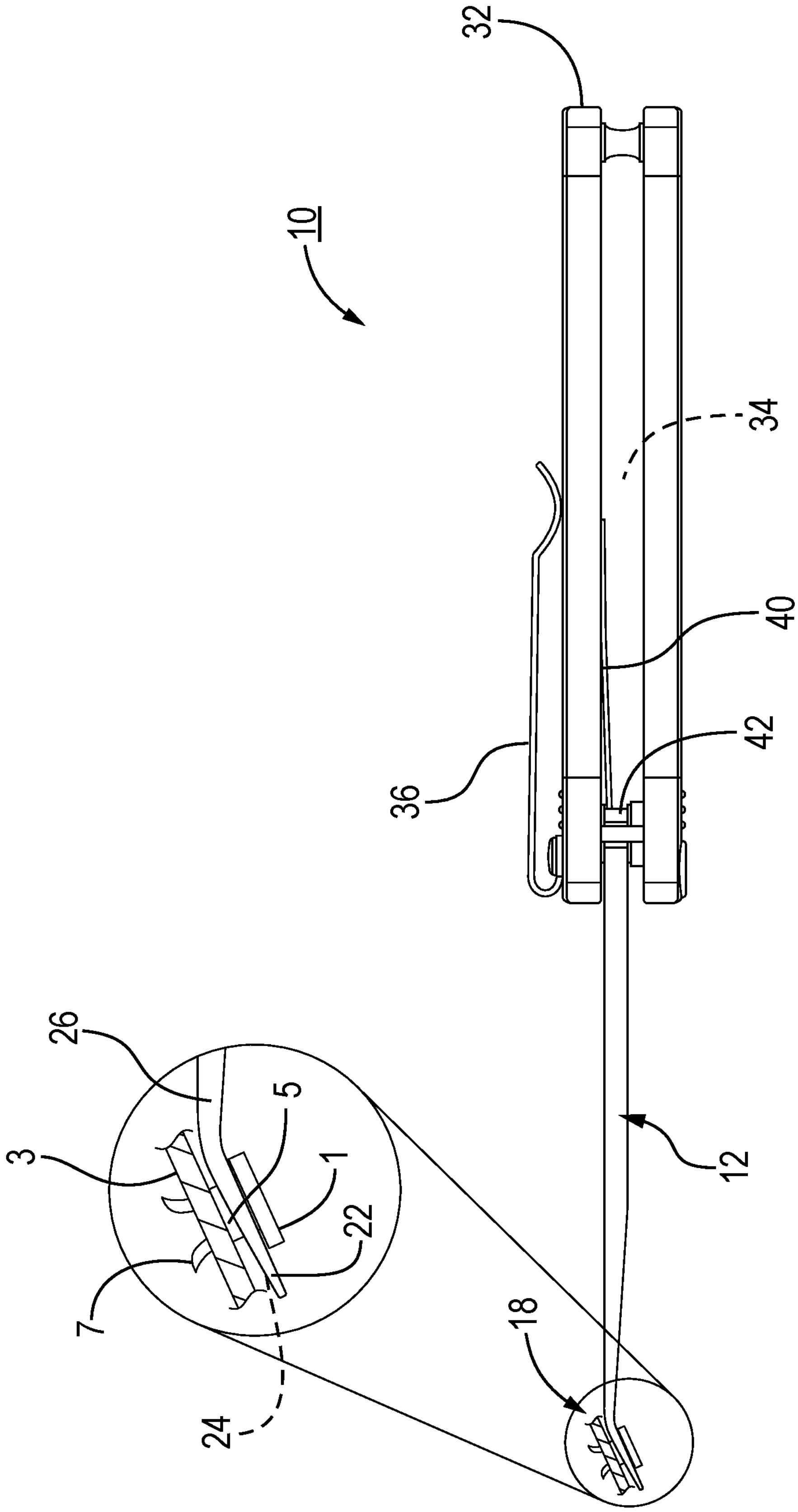
FIG. 4 is a side elevational view of the clip extractor tool as in FIG. 1 in which an inset shows an enlarged view of a leading portion of the tool in an intended use environment.
Figure 5:
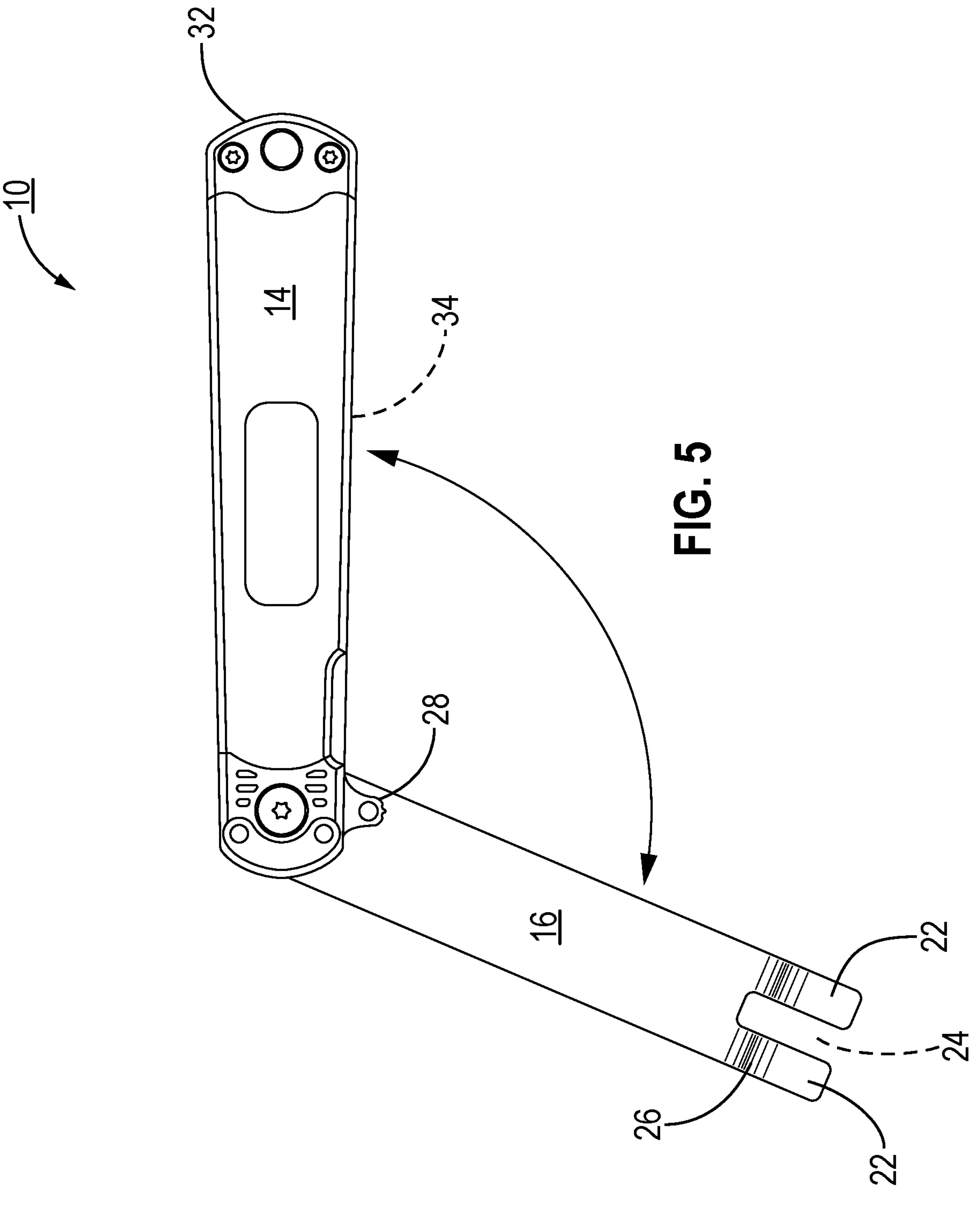
FIG. 5 is a top plan view of the clip extractor tool as in FIG. 1 shown in a second, partially open state.
Figure 6:
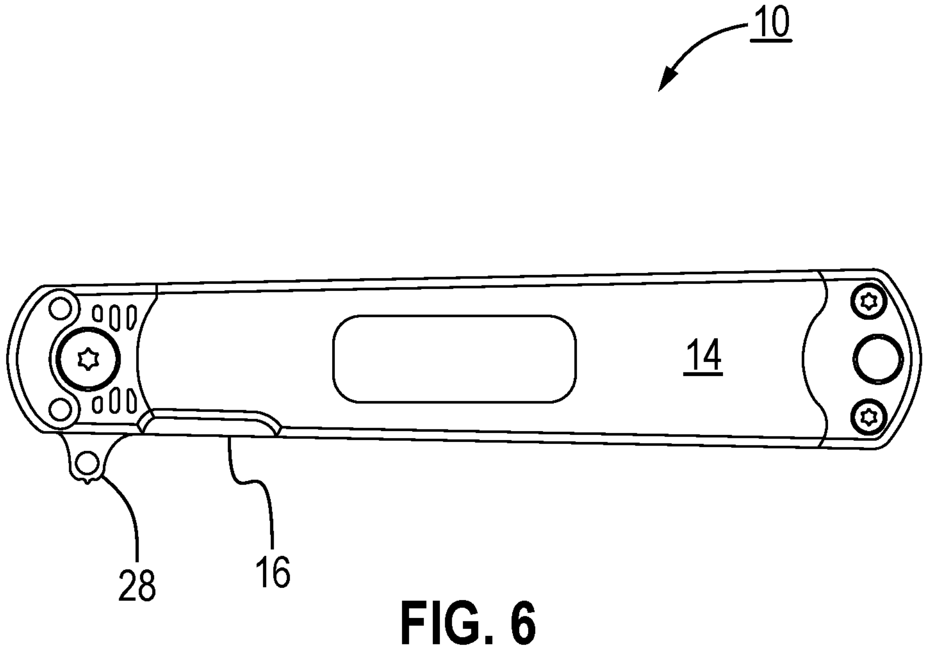
FIG. 6 is a top plan view of the clip extractor tool as in FIG. 1 shown in a third closed state.

FIGS. 4, 5, and 6—similar to FIGS. 2 and 3—show the clip lifter 10, the blade 12, the handle 14, the release 28, the compartment 34, the clip 36, the spring release 40, and the axle 42. More particularly, an enlarged inset in FIG. 4 most clearly shows the prongs 22, the channel 24, and the bend 26 formed at the distal end 18 of the blade 16. Here, a clip 1, often made of plastic material, is to be removed from a panel 3 (shown as a partial section for clarity), e.g., an automotive interior. So, by way of exemplary operation, the blade 12 is released from the compartment 34 by rotation around the axle 42 for the technician to slip the channel 24 between the prongs 22 around a neck 5 of the clip 1. By leveraging or prying the bend 26 against the panel 3, a leverage force will pull teeth 7 of the clip 1 through the panel 3. Once the clip 1 is removed, the technician can fold the blade 12 back into the compartment 34 as indicated by the double-headed arrow in FIG. 5, and then store the extractor 10 in a pocket or other convenient location until again needed, as shown in FIG. 6.

Figure 7:
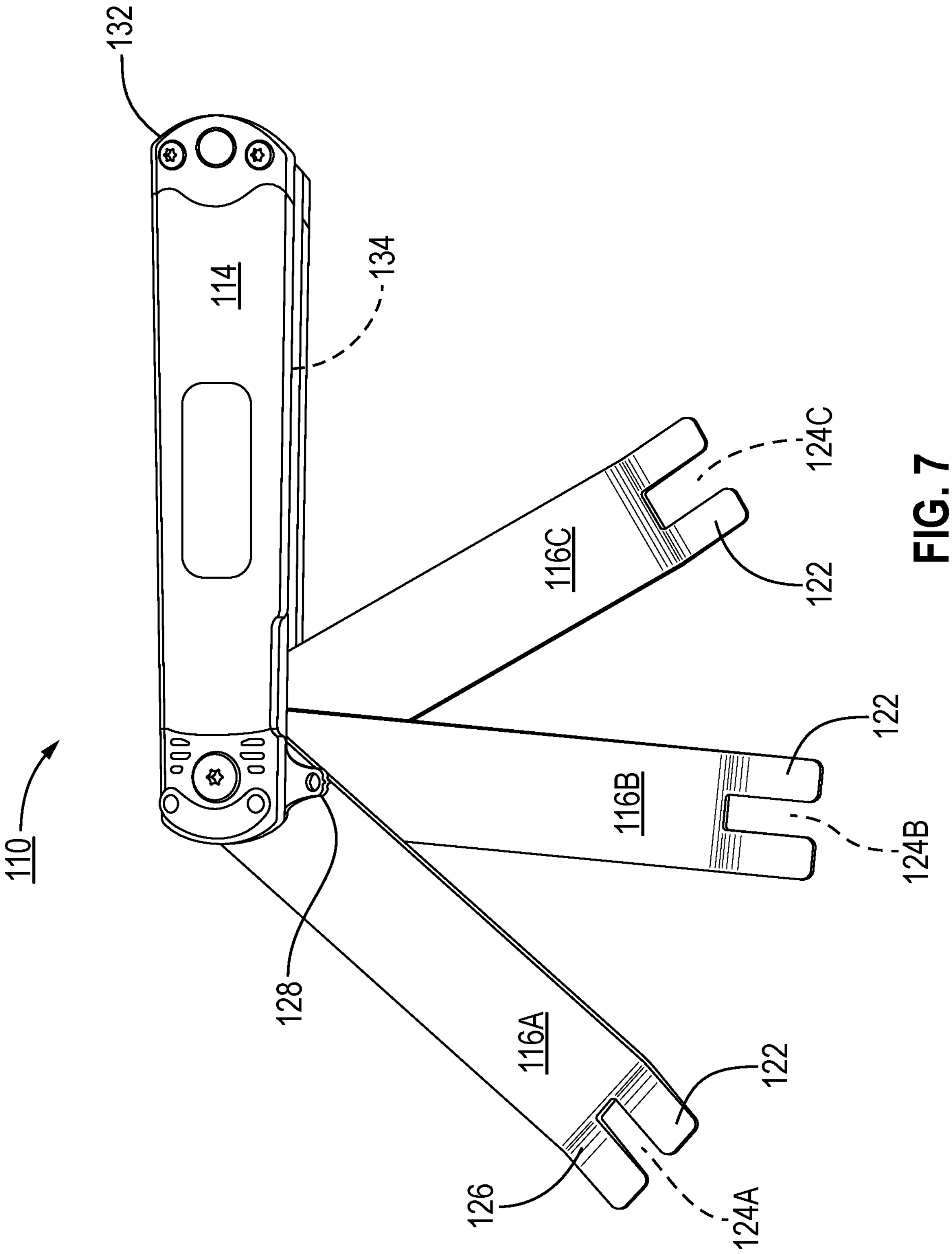
FIG. 7 is a top perspective view of an exemplary clip extractor tool shown with multiple extractor blades in various open states.

FIG. 7 shows a clip extractor tool broadly designated by element number 110. Although similar to the embodiment shown in the foregoing figures, the clip extractor tool 110 may include multiple blades 112A, 112B, 112C, a handle 114, a release 128, and a compartment 134. More particularly, each blade 112A, 112B, 112C has respective prongs 122 formed at curvatures or bends 126 of the blades 112A, 112B, 112C, and respective gaps or channels 124A, 124B, 124C are formed between the prongs 122 of the respective blades 112A, 112B, 112C. A technician can select one of the blades 112A, 112B, 112C based on the desired gap or channel 124A, 124B, 124C needed for a particular circumference of a neck 5 of a clip 1 to be extracted (see, e.g., the FIG. 4 inset). In this example, only three blades 112A, 112B,

112C are shown with channel 124A being smaller than channel 124B, which is smaller than channel 124C. However, the disclosure is not limited to this example—fewer or additional blades can be provided, and each blade and each gap, in addition to being a different size, may also be shaped differently.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

By way of example and not of limitation, exemplary embodiments as disclosed herein may include but are not limited to:

EMBODIMENT 1: A trim and clip extractor comprises a handle having a distal handle end and a proximal handle end and a compartment formed therebetween; an axle disposed proximate the proximal handle end; and an extractor blade having a distal blade end and a proximal blade end, the distal blade end having prongs forming a channel therebetween, the proximal blade end rotatably connected to the axle at the proximal handle end, the extractor blade and the prongs being configured for storage in the compartment when not in use.

EMBODIMENT 2: The trim and clip extractor as in embodiment 1, wherein the prongs are disposed at an angle relative to the extractor blade.

EMBODIMENT 3: The trim and clip extractor as in embodiments 1 or 2, wherein the channel is sized to receive a workpiece for extraction.

EMBODIMENT 4: The trim and clip extractor as in any of the foregoing embodiments, further comprising a latch disposed in the compartment in contact with the extractor blade, the latch being releasable to release the extractor blade for rotation about the axle.

EMBODIMENT 5: The trim and clip extractor as in any of the foregoing embodiments, further comprising a catch in communication with the latch, the catch being configured to press to release the latch.

EMBODIMENT 6: A trim and clip extractor comprises a handle having a distal handle end and a proximal handle end and a compartment formed therebetween; an axle disposed proximate the proximal handle end; and a plurality of extractor blades each having a distal blade end and a proximal blade end, each distal blade end having prongs forming a channel therebetween, at least one of the channels being different in size from the other channels, each proximal blade end being rotatably connected to the axle at the proximal handle end, the extractor blades being foldable for storage in the compartment when not in use.

EMBODIMENT 7: The trim and clip extractor as in embodiment 6, wherein each prong is disposed at an angle relative to the respective extractor blades.

The invention claimed is:

1. A trim and clip extractor, comprising:

a handle having a distal handle end and a proximal handle end with a compartment formed therebetween;

an axle disposed proximate the proximal handle end; and an extractor blade having a distal blade end and a proximal blade end, the distal blade end having prongs forming a channel therebetween, the prongs being disposed at an angle relative to the extractor blade, the channel being sized to receive a workpiece for extraction, the proximal blade end rotatably connected to the axle at the proximal handle end, the extractor blade and the prongs being configured for storage in the compartment when not in use.

2. The trim and clip extractor as in claim 1, further comprising a latch disposed in the compartment in contact with the extractor blade, the latch being releasable to release the extractor blade for rotation about the axle.

3. The trim and clip extractor as in claim 2, further comprising a catch in communication with the latch, the catch being configured to press to release the latch.

4. A trim and clip extractor, comprising:

a handle having a distal handle end and a proximal handle end with a compartment formed therebetween;

an axle disposed proximate the proximal handle end; and a plurality of extractor blades each having a distal blade end and a proximal blade end, each distal blade end having prongs forming respective channels therebetween, at least one of the channels being different in size from the other channels, the respective channels being complementary to workpieces of different sizes, each proximal blade end being rotatably connected to the axle at the proximal handle end, the extractor blades being foldable for storage in the compartment when not in use.

5. The trim and clip extractor as in claim 4, wherein each of the prongs are disposed at an angle relative to their respective extractor blades.

6. A trim and clip extractor, comprising:

a handle having a distal handle end and a proximal handle end with a compartment formed therebetween;

an axle disposed proximate the proximal handle end;

an extractor blade having a distal blade end and a proximal blade end, the distal blade end having prongs forming a channel therebetween, the channel being sized to receive a workpiece for extraction, the proximal blade end rotatably connected to the axle at the proximal handle end, the extractor blade and the prongs being configured for storage in the compartment when not in use; and a latch disposed in the compartment in contact with the extractor blade, the latch being releasable to release the extractor blade for rotation about the axle.

7. The trim and clip extractor as in claim 6, further comprising a catch in communication with the latch, the catch being configured to press to release the latch.

* * * * *